(12) United States Patent
Noh et al.

(10) Patent No.: US 11,454,786 B2
(45) Date of Patent: Sep. 27, 2022

(54) SMALL LENS SYSTEM INCLUDING SEVEN LENSES OF +-+-+-0 REFRACTIVE POWERS ON THE OPTICAL AXIS

(71) Applicant: SEKONIX CO., LTD., Gyeonggi-do (KR)

(72) Inventors: Ki Youn Noh, Gyeonggi-do (KR); Soon Cheol Choi, Gyeonggi-do (KR); Seong Jun Bae, Gyeonggi-do (KR); Su Jeong Kim, Gyeonggi-do (KR)

(73) Assignee: SEKONIX CO., LTD.

( * ) Notice: Subject to any disclaimer, the term of this patent is extended or adjusted under 35 U.S.C. 154(b) by 531 days.

(21) Appl. No.: 16/728,497

(22) Filed: Dec. 27, 2019

(65) Prior Publication Data
US 2021/0124151 A1    Apr. 29, 2021

(30) Foreign Application Priority Data

Oct. 29, 2019 (KR) .................. 10-2019-0134974

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2020/0003995 A1 * 1/2020 Jung ........................ G02B 9/64

* cited by examiner

*Primary Examiner* — Wen Huang
(74) *Attorney, Agent, or Firm* — Mendelsohn Dunleavy, P.C.

(57) ABSTRACT

Disclosed is a small lens system including a first lens, a second lens, a third lens, a fourth lens, a fifth lens, a sixth lens, and a seventh lens sequentially arranged from an object, wherein the first lens has a positive refractive power, the second lens has a negative refractive power, the third lens has a positive refractive power, the fourth lens has a negative refractive power, the fifth lens is convex toward the object, is concave toward an image, and has a positive refractive power, the sixth lens has a positive or negative refractive power and is provided with at least one inflection point, and the seventh lens has a positive or negative refractive power and is configured such that the radii of curvature R71 and R72 of the object-side surface and image-side surface of the seventh lens satisfy R71=∞ and R72=∞, respectively.

14 Claims, 11 Drawing Sheets

PRIOR ART

SMALL LENS SYSTEM INCLUDING SEVEN LENSES OF +−+−+−0 REFRACTIVE POWERS ON THE OPTICAL AXIS

BACKGROUND OF THE INVENTION

Field of the Invention

The present invention relates to a wide-angle lens system including a total of seven lenses, and more particularly to a small wide-angle lens system configured such that the lens system is small and lightweight by appropriately designing the refractive powers, shapes, etc. of the lenses and such that high-resolution images can be provided by correcting distortion, whereby it is possible to obtain wide-angle images.

Description of the Related Art

Recent mobile terminals are equipped with a camera, with which it is possible to perform video communication and to take photographs. In addition, as the number of functions of the camera in the mobile terminal gradually increases, demand for high resolution and wide angle of a camera for mobile terminals has gradually increased, and there is a trend toward miniaturization of the camera such that the mobile terminal can be easily and conveniently carried.

In recent years, a lens of the camera has been made of a plastic material, which is lighter than glass, in order to realize high quality, high performance, and miniaturization of the camera, and a lens system has been configured using six or more lenses in order to realize high resolution.

Particular, for a small lens mounted in a smartphone, it is advantageous to reduce the length of the lens system (total track length) as much as possible due to limitation in the thickness of the smartphone.

FIG. 1 shows a lens system disclosed in U.S. patent Ser. No. 10/048,471. In the lens system shown in FIG. 1, the ratio TTL/f of the distance TTL between the object-side surface of a first lens and an image surface to the effective focal distance f of the entire lens system is 1.3 or more, whereby the lens system is limited in application to a thin smartphone.

In the case in which TTL is shortened in order to reduce the TTL/f value, however, the tolerance of the lens system becomes sensitive, whereby there is high possibility of occurrence of design errors.

SUMMARY OF THE INVENTION

The present invention has been made in view of the above problems, and it is an object of the present invention to provide a small wide-angle lens system configured such that the lens system is small and lightweight by appropriately designing the refractive powers, shapes, etc. of the lenses and such that high-resolution images can be provided by correcting distortion.

In accordance with the present invention, the above and other objects can be accomplished by the provision of a small lens system including a first lens, a second lens, a third lens, a fourth lens, a fifth lens, a sixth lens, and a seventh lens sequentially arranged from an object, wherein the first lens has a positive refractive power, the second lens has a negative refractive power, the third lens has a positive refractive power, the fourth lens has a negative refractive power, the fifth lens is convex toward the object, is concave toward an image, and has a positive refractive power, the sixth lens has a positive or negative refractive power and is provided on at least one of an object-side surface and an image-side surface thereof with a single inflection point or a plurality of inflection points, and the seventh lens has a positive or negative refractive power and is configured such that the radius of curvature (R71) of the object-side surface of the seventh lens and the radius of curvature (R72) of the image-side surface of the seventh lens satisfy R71=∞ and R72=∞, respectively, and the ratio (TTL/f) of the distance (TTL) between the object-side surface of the first lens and an image surface to the effective focal distance f of the entire optical system satisfies TTL/f<1.3.

In addition, the absolute value of the ratio of the distance (TTL) between the object-side surface of the first lens and the image surface to an image height (ImagH) of the small lens system may satisfy 1.4<|TTL/ImagH|<1.6.

In addition, each of the first to seventh lenses may be made of a plastic material, all surfaces of the lenses may be formed as aspherical surfaces, and the small lens system may have a field of view greater than 80 degrees.

In addition, the Abbe number (V2) of the second lens and the Abbe number (V3) of the third lens may be configured to satisfy |V3−V2|<45, and the distance (To) from the object-side surface of the first lens to the object may satisfy 3500 mm<To<3700 mm.

In addition, the distance (T36) from the image-side surface of the third lens to the object-side surface of the sixth lens may satisfy T36<2.9 mm.

In addition, the absolute value of the ratio of the effective focal distance (f123) of the first lens, the second lens, and the third lens to the effective focal distance (f4567) of the fourth lens, the fifth lens, the sixth lens, and the seventh lens may satisfy 0.3<|f123/f4567|<0.8.

In addition, the ratio of the radius of curvature (R21) of the object-side surface of the second lens to the effective focal distance (f) of the entire optical system may satisfy 0.5<R21/f.

In addition, the radius of curvature (R41) of the object-side surface of the fourth lens and the radius of curvature (R42) of the image-side surface of the fourth lens may be configured to satisfy −0.5<(R41−R42)/(R41+R42)<0.5.

In addition, the focal distance (f2) of the second lens and the focal distance (f3) of the third lens may be configured to satisfy |f3|<|f2|.

In addition, the ratio of a field of view (Fov) of the small lens system to the effective focal distance (f) of the entire optical system may satisfy 7<Fov/f. In addition, the Abbe number (V1) of the first lens, the Abbe number (V2) of the second lens, the Abbe number (V3) of the third lens, the Abbe number (V4) of the fourth lens, the Abbe number (V5) of the fifth lens, the Abbe number (V6) of the sixth lens, and the Abbe number (V7) of the seventh lens may satisfy 50<V1<60, 15<V2<30, 50<V3<60, 15<V4<30, 50<V5<60, 50<V6<60, and 50<V7<60, respectively.

The small lens system according to the present invention may be mounted in a camera module of a mobile device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a wide-angle lens system including a total of seven lenses, and more particularly to a lens system configured such that a first lens, a second lens, a third lens, a fourth lens, a fifth lens, a sixth lens, and a seventh lens are sequentially arranged from an object along an optical axis.

In addition, the present invention relates to a small wide-angle lens system configured such that the lens system is short, small, and lightweight by appropriately designing the refractive powers, shapes, etc. of the lenses and such that the performance of the lens system is easily reproduced while the lens system is easily manufactured by alleviating tolerance and correcting aberration, thereby it is possible to improve productivity and to obtain high-resolution images.

In addition, the ratio of the distance between the object-side surface of the first lens and an image surface to the image height is small, whereby it is possible to provide a lens system having a short length, which is easily applicable to a thin or small camera module, particularly a camera module in a mobile device, such as a smartphone.

Figure 1:
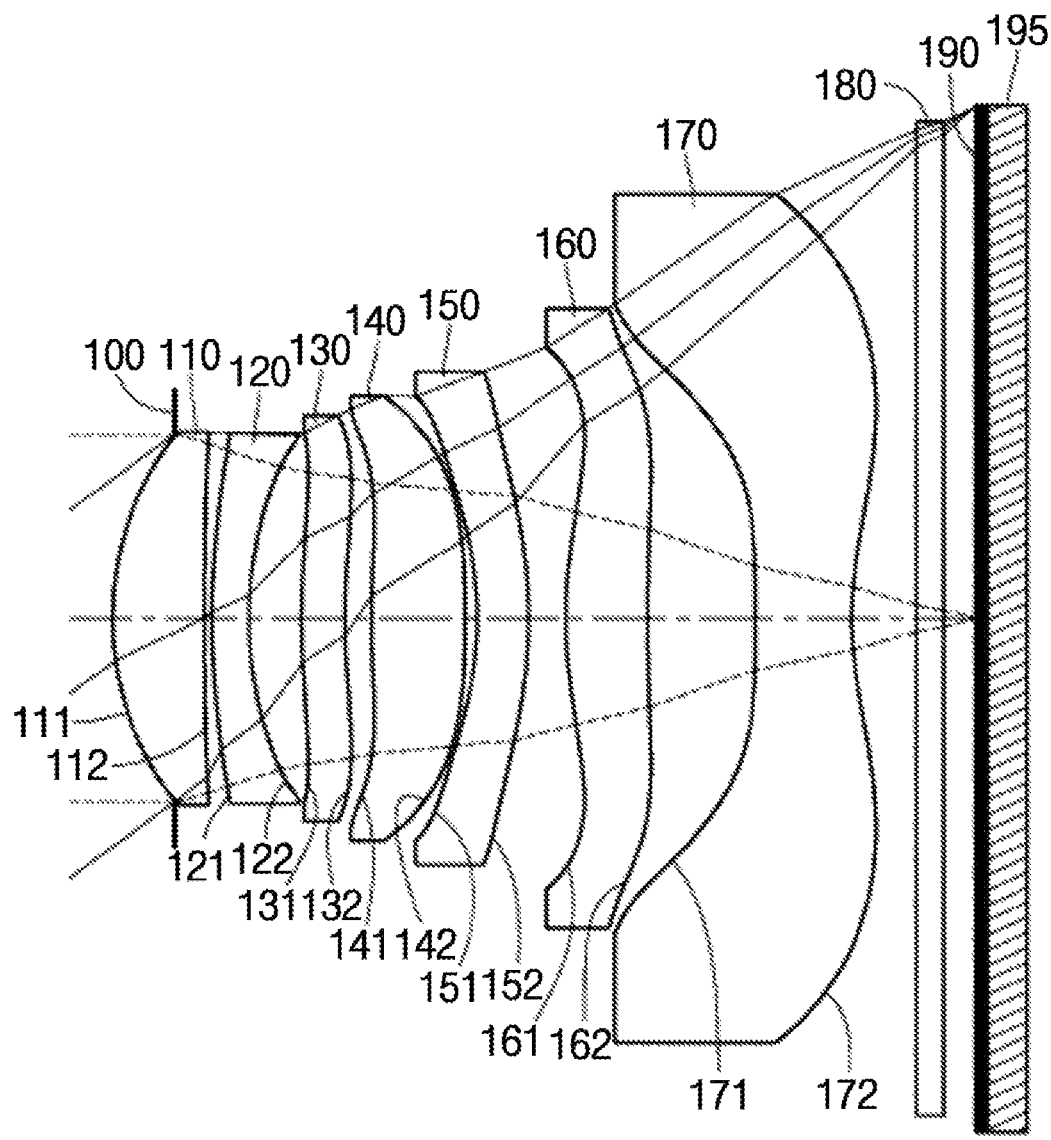
FIG. 1 is a schematic view showing a conventional small wide-angle lens system.
Figure 2:
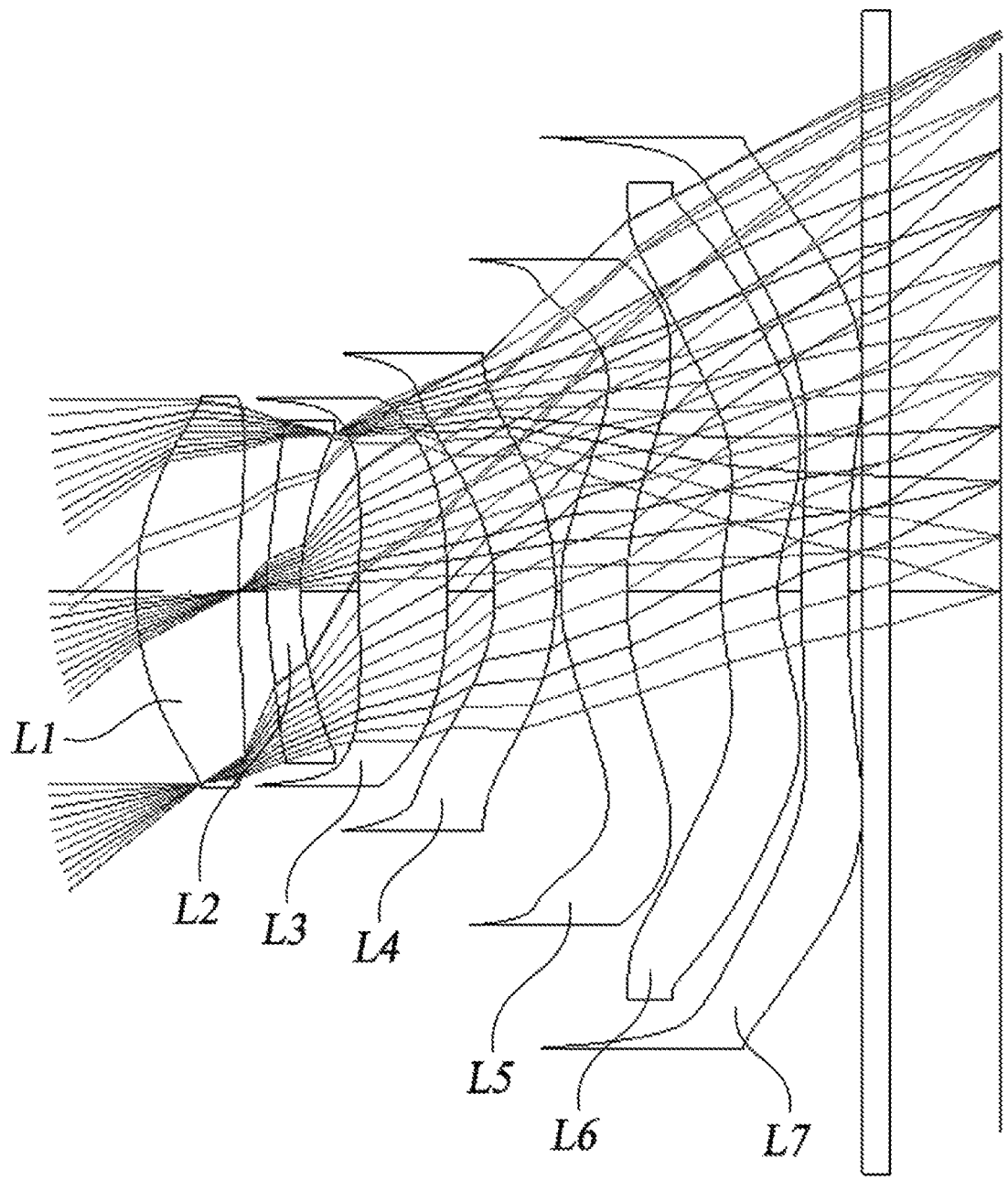
FIG. 2 is a view showing a first embodiment of a small wide-angle lens system according to the present invention.
Figure 3:
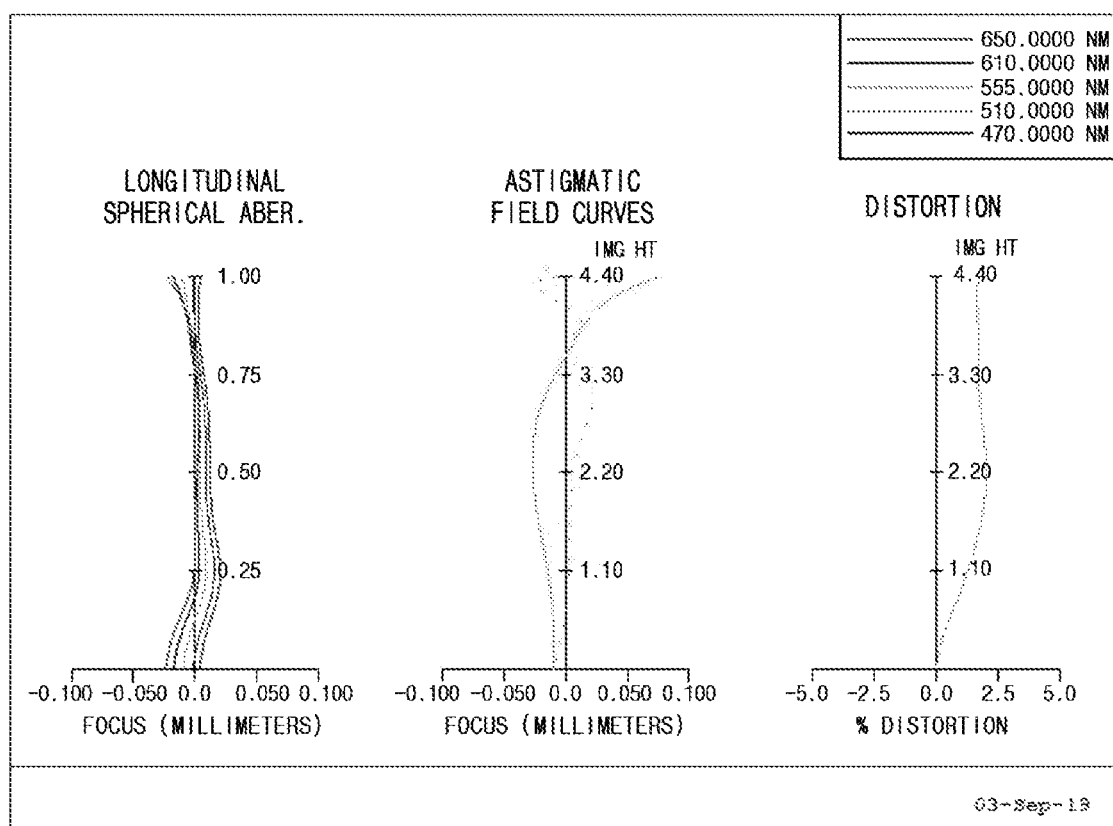
FIG. 3 is a view showing aberration according to a first embodiment of the present invention.
Figure 4:
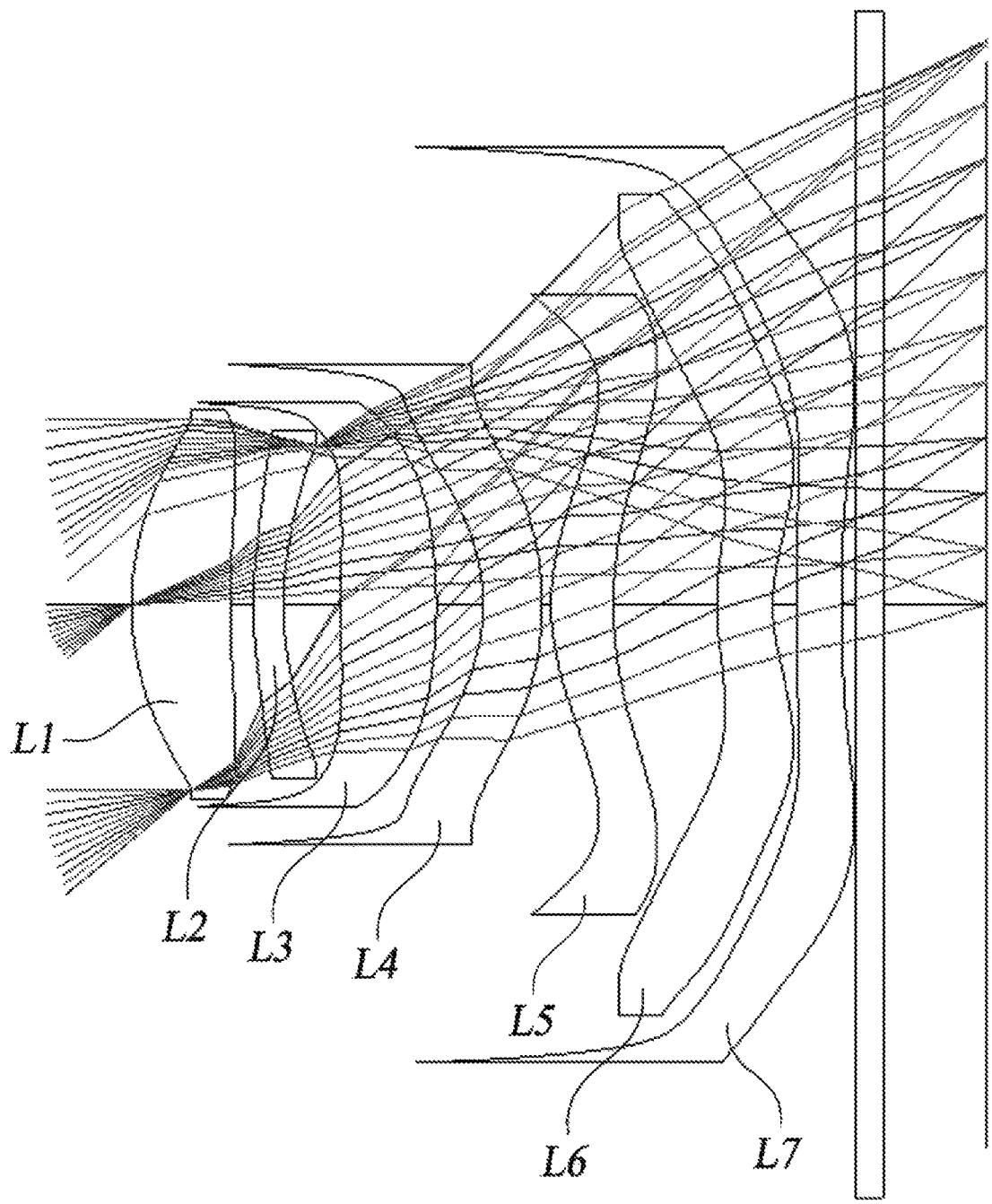
FIG. 4 is a view showing a second embodiment of the small wide-angle lens system according to the present invention.
Figure 5:
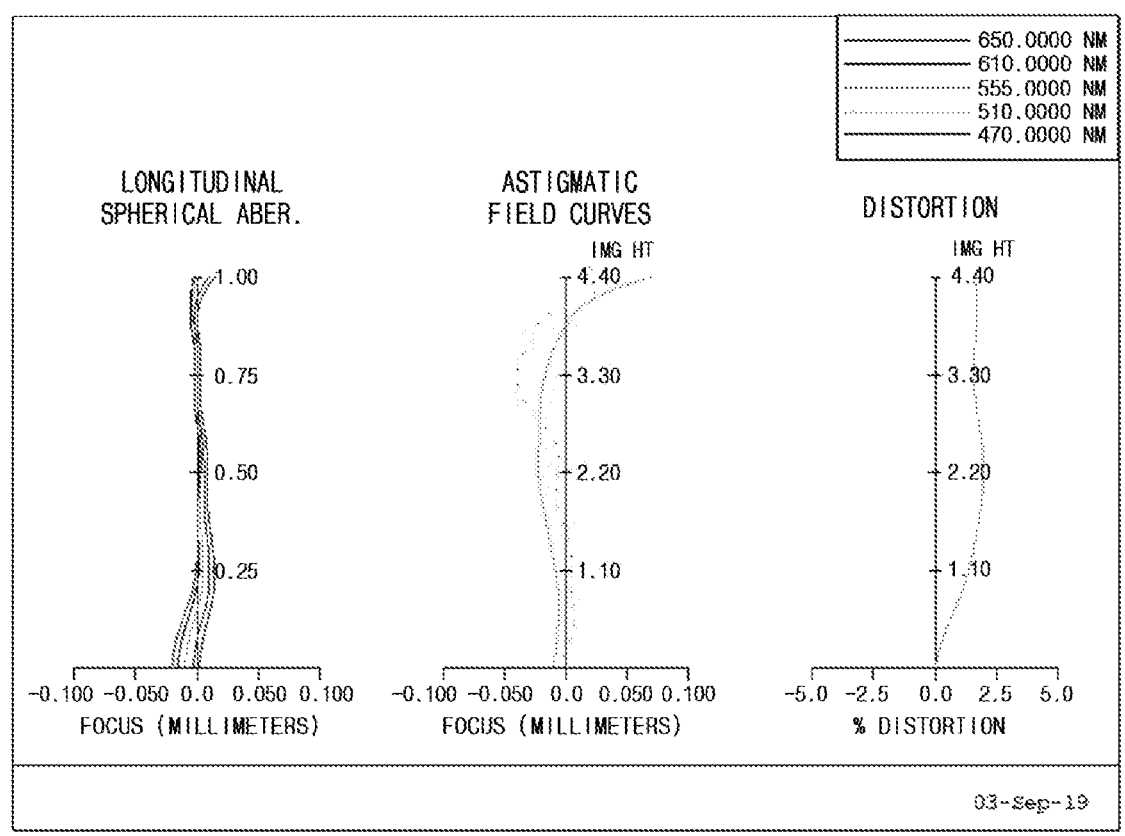
FIG. 5 is a view showing aberration according to a second embodiment of the present invention.
Figure 6:
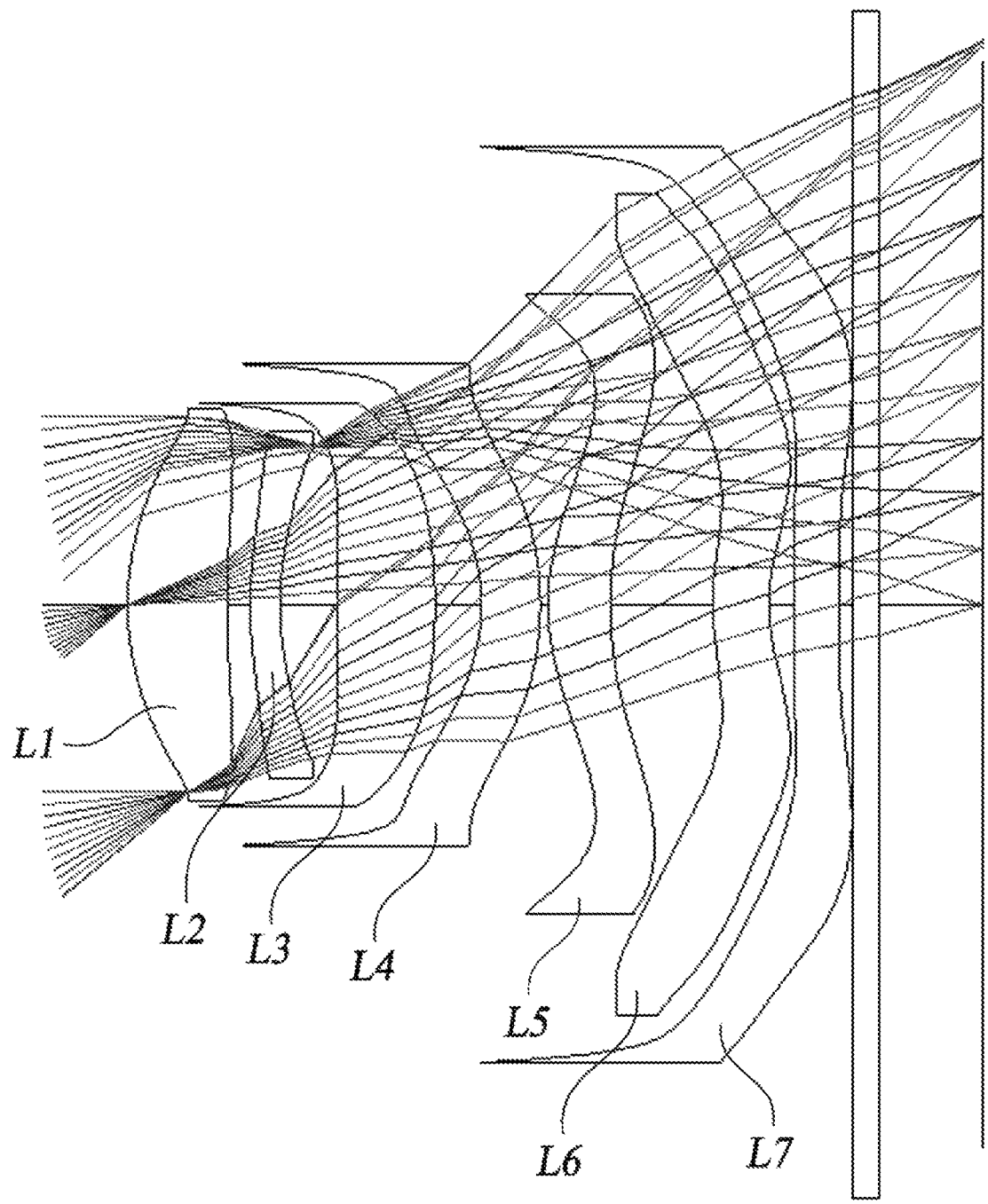
FIG. 6 is a view showing a third embodiment of the small wide-angle lens system according to the present invention.
Figure 7:
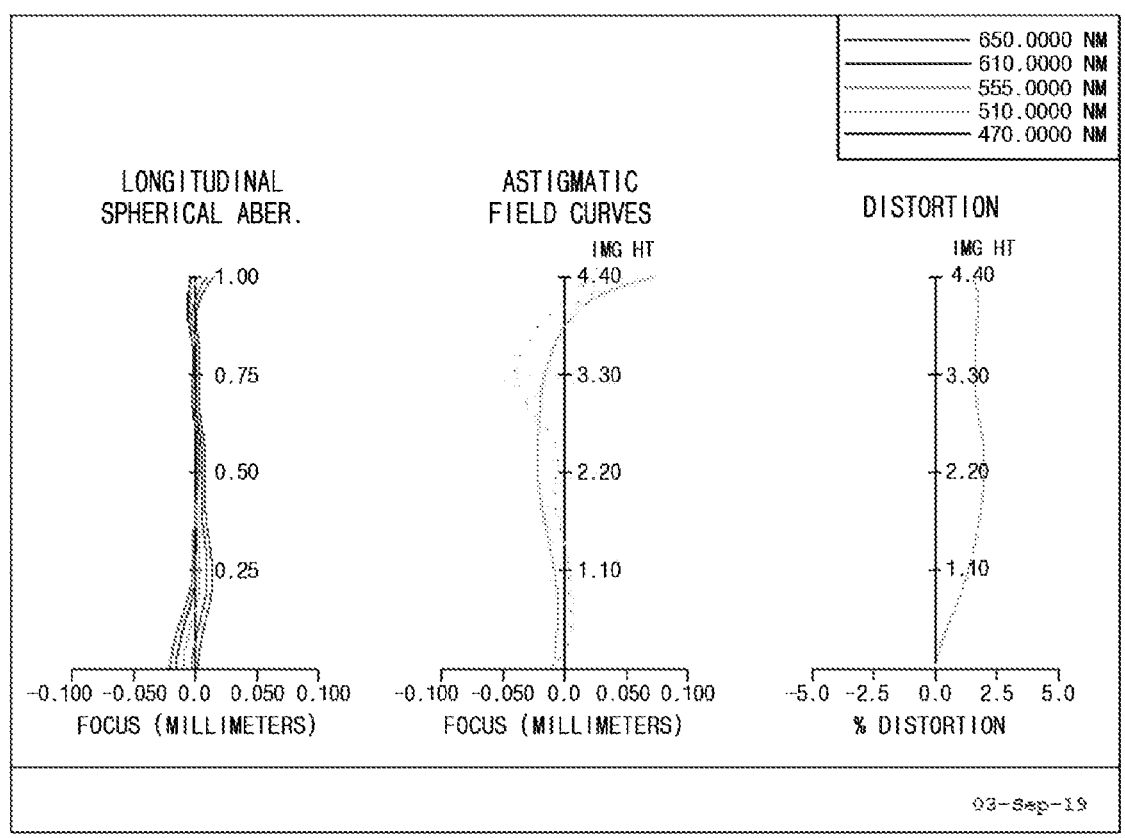
FIG. 7 is a view showing aberration according to a third embodiment of the present invention.
Figure 8:
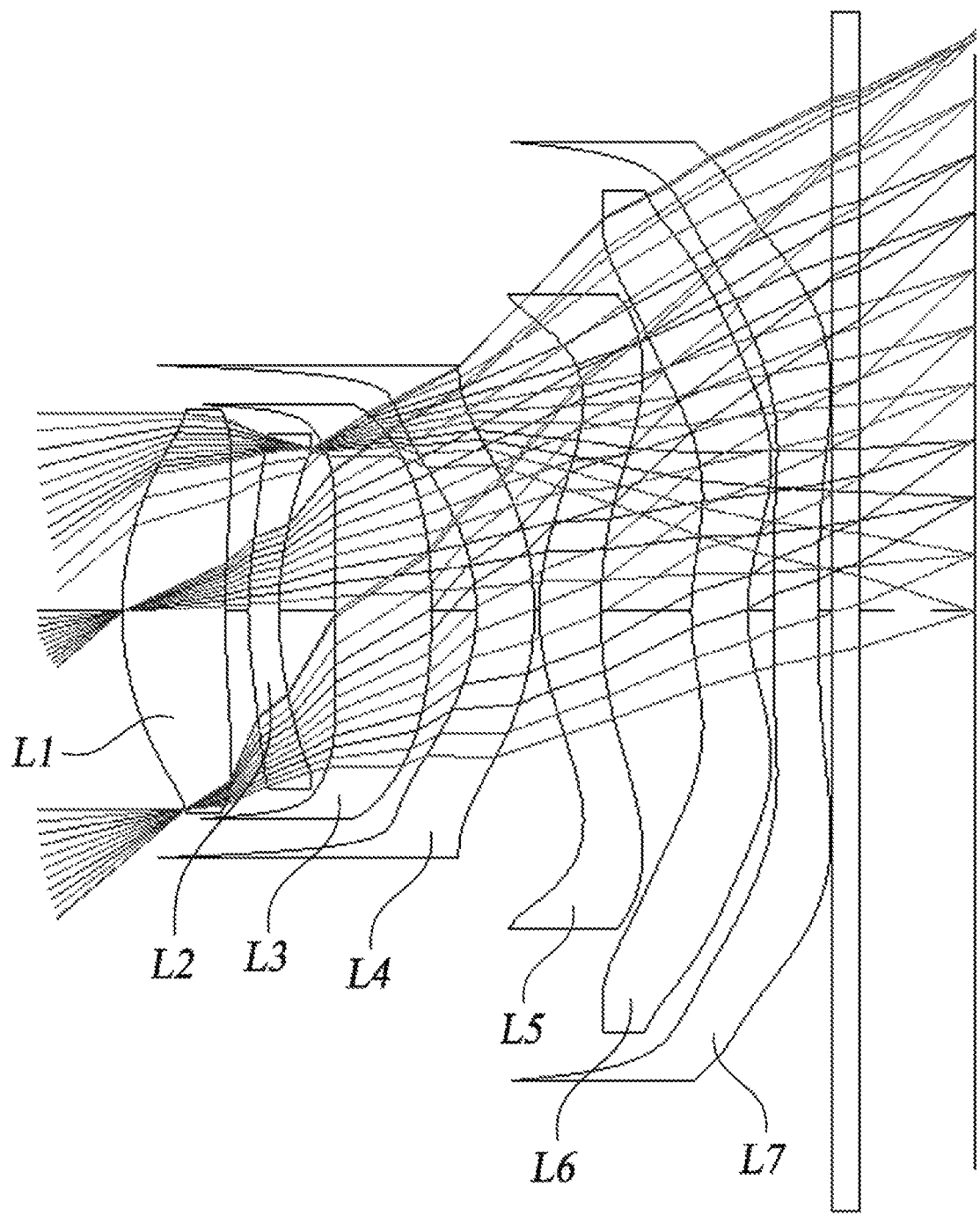
FIG. 8 is a view showing a fourth embodiment of the small wide-angle lens system according to the present invention.
Figure 9:
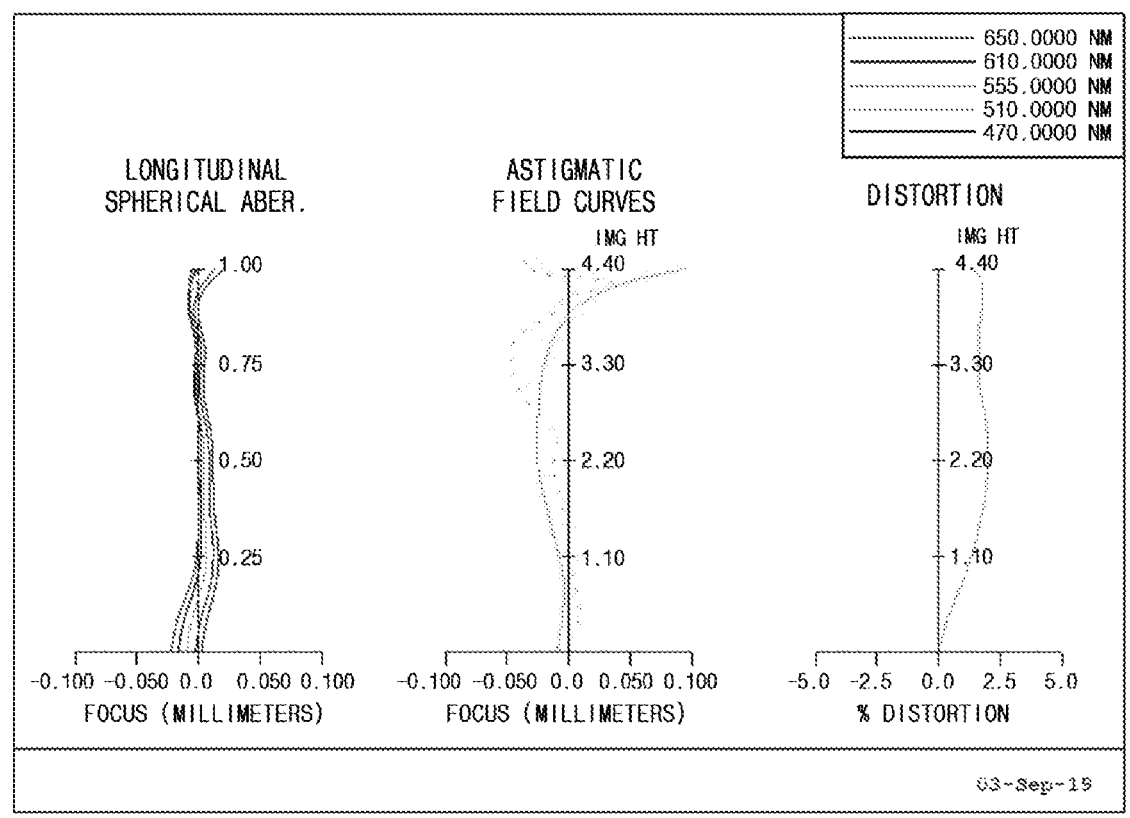
FIG. 9 is a view showing aberration according to a fourth embodiment of the present invention.
Figure 10:
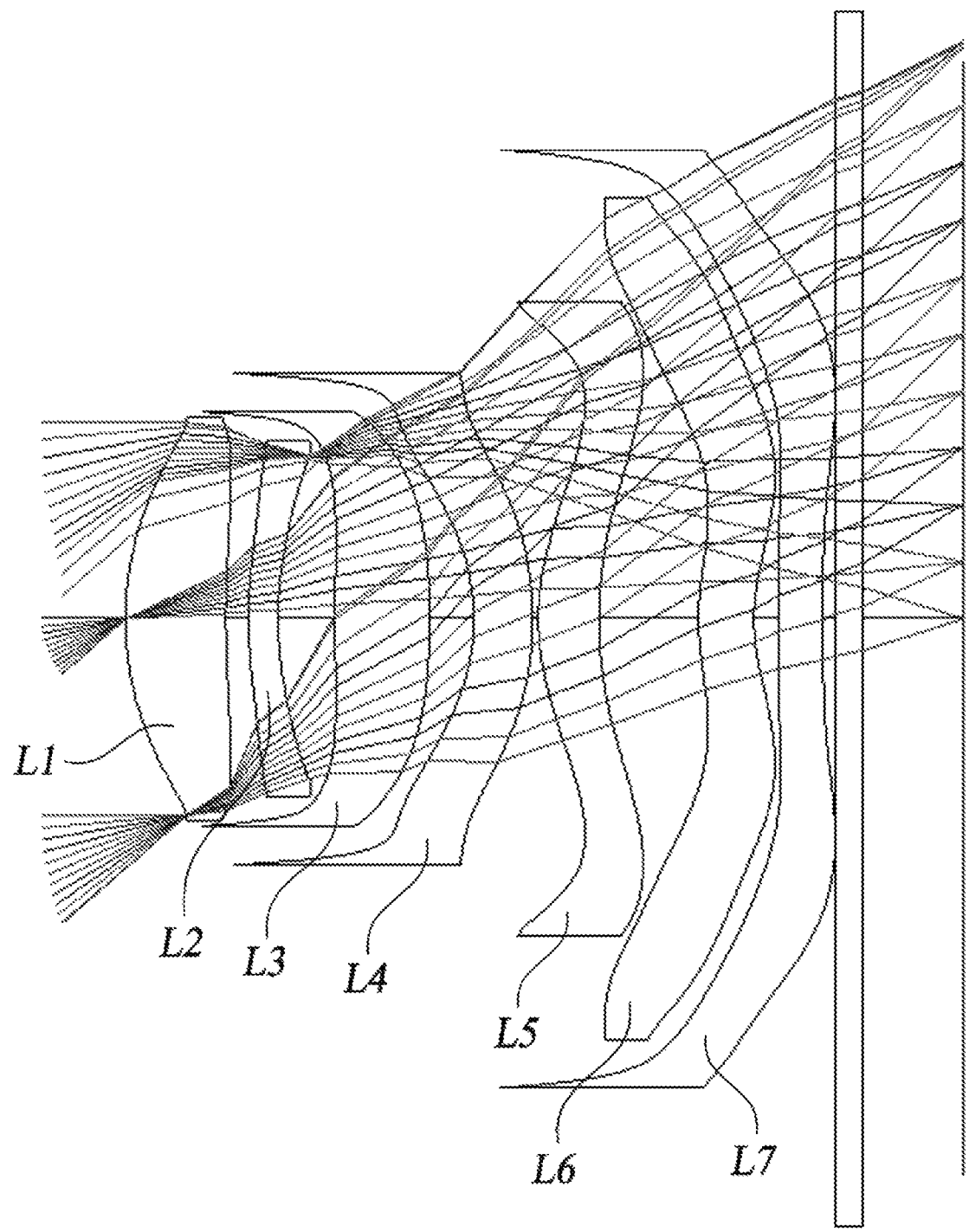
FIG. 10 is a view showing a fifth embodiment of the small wide-angle lens system according to the present invention.
Figure 11:
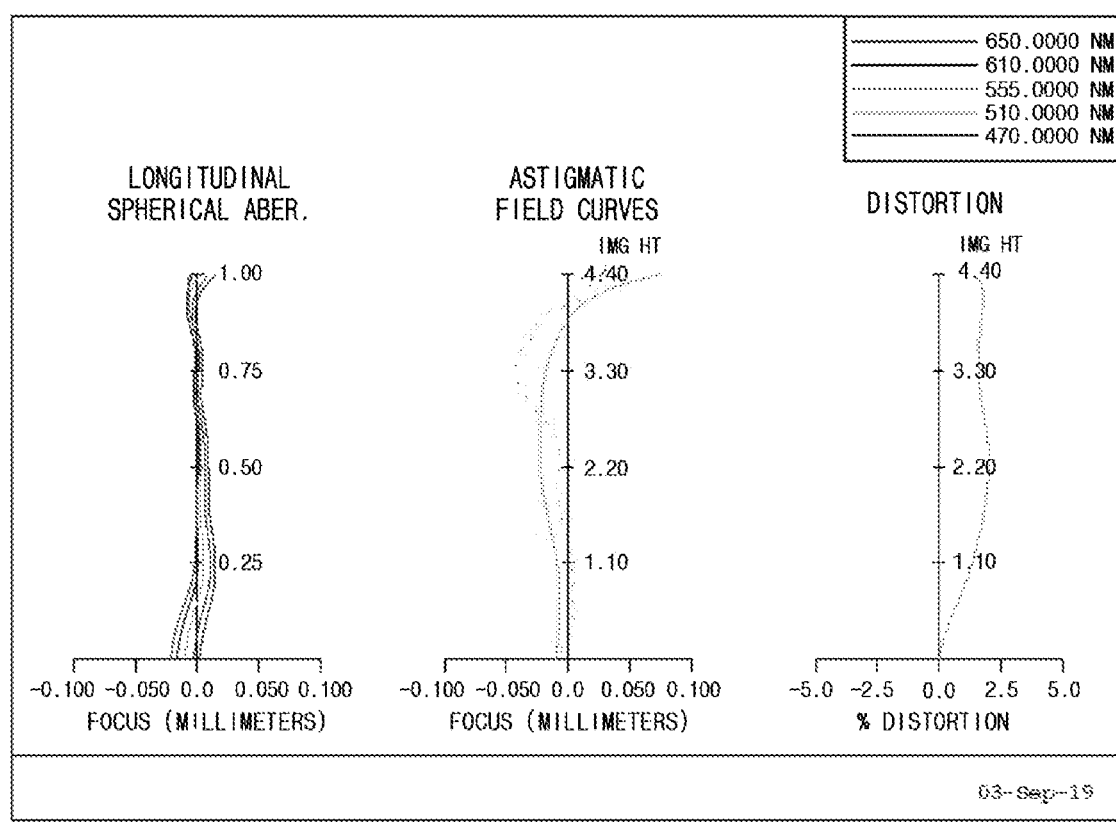
FIG. 11 is a view showing aberration according to a fifth embodiment of the present invention.

Hereinafter, the present invention will be described in detail with reference to the accompanying drawings. FIG. 2 is a view showing a first embodiment of a small wide-angle lens system according to the present invention, FIG. 3 is a view showing aberration according to a first embodiment of the present invention, FIG. 4 is a view showing a second embodiment of the small wide-angle lens system according to the present invention, FIG. 5 is a view showing aberration according to a second embodiment of the present invention, FIG. 6 is a view showing a third embodiment of the small wide-angle lens system according to the present invention, FIG. 7 is a view showing aberration according to a third embodiment of the present invention, FIG. 8 is a view showing a fourth embodiment of the small wide-angle lens system according to the present invention, FIG. 9 is a view showing aberration according to a fourth embodiment of the present invention, FIG. 10 is a view showing a fifth embodiment of the small wide-angle lens system according to the present invention, and FIG. 11 is a view showing aberration according to a fifth embodiment of the present invention.

As shown, the present invention provides a small lens system configured such that a first lens L1, a second lens L2, a third lens L3, a fourth lens L4, a fifth lens L5, a sixth lens L6, and a seventh lens L7 are sequentially arranged from an object along an optical axis, wherein the first lens L1 has a positive refractive power, the second lens L2 has a negative refractive power, the third lens L3 has a positive refractive power, the fourth lens L4 has a negative refractive power, and the fifth lens L5 is convex toward the object, is concave toward an image, and has a positive refractive power.

Consequently, the positive and negative refractive powers of the respective lenses constituting the lens system are uniformly distributed, whereby it is possible to realize high performance suitable for a high-resolution small lens system.

In particular, the sixth lens L6 has a positive or negative refractive power and is provided on at least one of the object-side surface and the image-side surface thereof with a single inflection point or a plurality of inflection points, and the seventh lens L7 has a positive or negative refractive power and is configured such that the radius of curvature R71 of the object-side surface of the seventh lens L7 and the radius of curvature R72 of the image-side surface of the seventh lens L7 satisfy R71=∞ and R72=∞, respectively, whereby it is advantageous in securing a space for the lenses in a barrel, which is a design suitable for a small lens system.

The ratio TTL/f of the distance TTL between the object-side surface of the first lens L1 and an image surface to the effective focal distance f of the entire optical system satisfies TTL/f<1.3.

Also, in the small lens system according to the present invention, the absolute value of the ratio of the distance TTL between the object-side surface of the first lens L1 and the image surface to the image height ImagH satisfies 1.4<|TTL/ImagH|<1.6, whereby it is possible to provide a small lens system having a short length, which is suitable for mounting in a small mobile device, such as a smartphone having a small thickness.

That is, it is possible to miniaturize the first lens L1. In addition, the refractive power of the first lens L1 is very small while the curvature of the first lens L1 is relatively high, whereby the tolerance of the first lens L1 is alleviated even though TTL of the first lens L1 is very short, and therefore a possibility of reproducing the performance of the first lens L1 is increased.

In addition, each of the first to seventh lenses L1 to L7 is made of a plastic material, and all surfaces of the lenses are formed as aspherical surfaces, whereby it is possible to correct spherical aberration and chromatic aberration. Furthermore, each of the lenses is made of a material having a refractive index advantageous to reduce the length thereof, and the lenses are made of materials having different Abbe numbers so as to be advantageous in correcting chromatic aberration.

In addition, the small lens system according to the present invention is characterized in that the field of view of the small lens system is greater than 80 degrees, and provides a wide-angle image.

In addition, the Abbe number V2 of the second lens L2 and the Abbe number V3 of the third lens L3 are configured to satisfy |V3−V2|<45. Consequently, it is possible to obtain high-resolution images by adjusting the refractive indices of the second lens L2 and the third lens L3.

In addition, the distance To from the object-side surface of the first lens L1 to the object satisfies 3500 mm<To<3700 mm, which is a design suitable for a small lens system.

In addition, the distance T36 from the image-side surface of the third lens L3 to the object-side surface of the sixth lens L6 satisfies T36<2.9 mm, which is a design suitable for a small lens system.

In addition, the absolute value of the ratio of the effective focal distance f123 of the first lens L1, the second lens L2, and the third lens L3 to the effective focal distance f4567 of the fourth lens L4, the fifth lens L5, the sixth lens L6, and the seventh lens L7 satisfies 0.3<|f123/f4567|<0.8.

This means that the absolute value of the ratio of the effective focal distance of the first lens L1, the second lens L2, and the third lens L3 to the effective focal distance of the fourth lens L4, the fifth lens L5, the sixth lens L6, and the seventh lens L7 is defined, whereby the lenses have a strong refractive power, and therefore a miniaturized wide-angle lens system is achieved.

In addition, the ratio of the radius of curvature R21 of the object-side surface of the second lens L2 to the effective focal distance f of the entire optical system satisfies 0.5<R21/f. That is, the radius of curvature of the object-side surface of the second lens L2 and the effective focal distance of the entire optical system are adjusted, which is advantageous in designing a small lens system.

In addition, the radius of curvature R41 of the object-side surface of the fourth lens L4 and the radius of curvature R42 of the image-side surface of the fourth lens L4 are configured to satisfy −0.5<(R41−R42)/(R41+R42)<0.5. Consequently, it is possible to reduce the length of the entire lens system and to smoothly maintain the flow of a resin during injection of the resin, whereby manufacturing tolerance is alleviated. Consequently, a possibility of reproducing the performance of the fourth lens L4 is increased, and therefore it is advantageous for application to a small lens system.

In addition, the focal distance f2 of the second lens L2 and the focal distance f3 of the third lens L3 are configured to satisfy |f3|<|f2|. Consequently, it is possible to correct aberration and to miniaturize the lens system. Furthermore, the focal distance of the second lens L2 is increased, whereby the tolerance of the second lens L2 is alleviated.

In addition, the ratio of the field of view Fov of the small lens system to the effective focal distance f of the entire optical system satisfies 7<Fov/f, which is advantageous in designing a small wide-angle lens system. In addition, the Abbe number V1 of the first lens L1, the Abbe number V2 of the second lens L2, the Abbe number V3 of the third lens L3, the Abbe number V4 of the fourth lens L4, the Abbe number V5 of the fifth lens L5, the Abbe number V6 of the sixth lens L6, and the Abbe number V7 of the seventh lens L7 satisfy 50<V1<60, 15<V2<30, 50<V3<60, 15<V4<30, 50<V5<60, 50<V6<60, and 50<V7<60, respectively. That is, the Abbe numbers of the respective lenses are uniformly distributed, whereby power is divided and chromatic aberration is corrected.

As described above, the present invention relates to a lens system including a total of seven lenses, more particularly to a lens system configured such that a first lens L1, a second lens L2, a third lens L3, a fourth lens L4, a fifth lens L5, a sixth lens L6, and a seventh lens L7 are sequentially arranged from an object along an optical axis.

In addition, the present invention provides a small wide-angle lens system configured such that the lens system is small and lightweight by appropriately designing the refractive powers, shapes, etc. of the lenses and such that the lens system has a field of view greater than 80 degrees by correcting distortion.

In particular, the present invention provides a small wide-angle lens system configured such that the overall curvature of the lens system is increased in order to reduce power, whereby the tolerance of the lens system is alleviated even though TTL is short, wherein the ratio of the distance between the object-side surface of the first lens L1 and an image surface to the height of the image surface is less than 1.5, whereby it is possible to provide a lens system having a short length, which is easily applicable to a thin or small camera module, particularly a smartphone.

Hereinafter, embodiments of the present invention will be described with reference to the accompanying drawings.

First Embodiment

FIG. 2 is a view showing a first embodiment of a small high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 1 below shows numerical data of the lenses constituting the lens system according to the first embodiment of the present invention.

TABLE 1

| Surface (Surface number) | RDY (Radius of curvature) | THI (Thickness) | Nd (Refractive index) | Vd (Abbe number) |
|---|---|---|---|---|
| OBJECT | INFINITY | 3600 | | |
| 1 | 2.35 | 0.77 | 1.5441 | 56.0 |
| 2 | 6.47 | 0.22 | | |
| STO: | 3.09 | 0.26 | 1.67 | 19.4 |
| 4 | 2.48 | 0.45 | | |
| 5 | 29.83 | 0.67 | 1.5441 | 56.0 |
| 6 | −4.84 | 0.36 | | |
| 7 | −1.47 | 0.46 | 1.615 | 25.9 |
| 8 | −2.77 | 0.04 | | |
| 9 | 1.76 | 0.50 | 1.5441 | 56.0 |
| 10 | 3.27 | 0.71 | | |
| 11 | 1.96 | 0.43 | 1.5441 | 56.0 |
| 12 | 1.45 | 0.19 | | |
| 13 | INFINITY | 0.35 | 1.535 | 56.0 |
| 14 | INFINITY | 0.10 | | |
| 15 | INFINITY | 0.21 | | |
| 16 | INFINITY | 0.83 | | |
| IMG: | INFINITY | 0.01 | | |

As shown in FIG. 2, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, the following aspherical equation is defined.

[Mathematical Expression 1]

$$X(Y) = \frac{Y^2}{R} \frac{1}{1+\sqrt{1-(1+K)\left(\frac{Y}{R}\right)^2}} + A_3 Y^4 + A_4 Y^6 + A_5 Y^8 + A_6 Y^{10} + \ldots + A_{14} Y^{16}$$

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 2 below.

TABLE 2

| | K | A3 | A4 | A5 | A6 | A7 |
|---|---|---|---|---|---|---|
| s1 | 0.01090 | −5.700000E−03 | 1.570000E−02 | −3.940000E−02 | 5.710000E−02 | −5.350000E−02 |
| s2 | −2.413000E+01 | −3.920000E−02 | 2.430000E−02 | −1.950000E−02 | 2.410000E−02 | −3.100000E−02 |
| s3 | −32.51370 | 1.800000E−02 | −1.476000E−01 | 2.721000E−01 | −2.879000E−01 | 1.975000E−01 |
| s4 | −23.77250 | 1.056000E−01 | −2.907000E−01 | 5.745000E−01 | −7.911000E−01 | 7.868000E−01 |
| s5 | −99.00000 | −2.910000E−02 | 2.900000E−02 | −1.493000E−01 | 3.471000E−01 | −5.117000E−01 |
| s6 | −22.98560 | −5.130000E−02 | 1.470000E−02 | −6.910000E−02 | 1.462000E−01 | −1.910000E−01 |
| s7 | −1.18690 | 1.208000E−01 | −2.461000E−01 | 3.466000E−01 | −3.424000E−01 | 2.349000E−01 |
| s8 | −2.59120 | −5.520000E−02 | −3.030000E−02 | 1.039000E−01 | −1.133000E−01 | 7.470000E−02 |
| s9 | −5.66780 | −1.320000E−02 | 2.260000E−02 | −3.200000E−02 | 2.170000E−02 | −9.200000E−03 |
| s10 | −27.63400 | 1.046000E−01 | −8.810000E−02 | 4.240000E−02 | −1.420000E−02 | 3.200000E−03 |
| s11 | −1.31020 | −2.591000E−01 | 1.306000E−01 | −5.660000E−02 | 1.850000E−02 | −4.000000E−03 |
| s12 | −4.08100 | −1.725000E−01 | 1.041000E−01 | −5.500000E−02 | 1.940000E−02 | −4.200000E−03 |
| s13 | 0.00000 | 3.900000E−02 | −1.510000E−02 | −7.000000E−03 | 5.200000E−03 | −1.400000E−03 |
| s14 | 0.00000 | 6.060000E−02 | −2.910000E−02 | 5.600000E−03 | −5.000000E−04 | −1.751000E−05 |
| s15 | | | | INFINITY | | |
| s16 | | | | INFINITY | | |

| | A8 | A9 | A10 | A11 |
|---|---|---|---|---|
| s1 | 3.180000E−02 | −1.170000E−02 | 2.400000E−03 | −2.000000E−04 |
| s2 | 2.540000E−02 | −1.230000E−02 | 3.200000E−03 | −3.000000E−04 |
| s3 | −8.300000E−02 | 1.760000E−02 | −5.000000E−04 | −3.000000E−04 |
| s4 | −5.415000E−01 | 2.415000E−01 | −6.220000E−02 | 7.000000E−03 |
| s5 | 4.718000E−01 | −2.647000E−01 | 8.220000E−02 | −1.080000E−02 |
| s6 | 1.514000E−01 | −7.080000E−02 | 1.800000E−02 | −1.900000E−03 |
| s7 | −1.047000E−01 | 2.880000E−02 | −4.400000E−03 | 3.000000E−04 |
| s8 | −3.070000E−02 | 7.600000E−03 | −1.100000E−03 | 6.192000E−05 |
| s9 | 2.500000E−03 | −4.000000E−04 | 3.747000E−05 | −1.452000E−06 |
| s10 | −5.000000E−04 | 4.089000E−05 | −1.975000E−06 | 3.952000E−08 |
| s11 | 5.000000E−04 | −4.357000E−05 | 1.963000E−06 | −3.765000E−08 |
| s12 | 6.000000E−04 | −4.593000E−05 | 2.053000E−06 | −3.902500E−08 |
| s13 | 2.000000E−04 | −1.531000E−05 | 6.605000E−07 | −1.191000E−08 |
| s14 | 7.598000E−06 | −6.733000E−07 | 2.562000E−08 | −3.513000E−10 |
| s15 | | INFINITY | | |
| s16 | | INFINITY | | |

The ratio TTL/f of the distance TTL between the object-side surface of the first lens L1 and an image surface to the effective focal distance f of the entire optical system satisfies TTL/f=1.28.

The ratio of the radius of curvature R21 of the object-side surface of the second lens L2 to the effective focal distance f of the entire optical system satisfies R21/f=0.61, and the radius of curvature R41 of the object-side surface of the fourth lens L4 and the radius of curvature R42 of the image-side surface of the fourth lens L4 are configured to satisfy (R41−R42)/(R41+R42)=0.31.

In addition, the absolute value of the ratio TTL/ImagH of the distance TTL between the object-side surface of the first lens L1 and the image surface to the image height ImagH of the small lens system according to the present invention satisfies |TTL/ImagH|=1.53.

In addition, the absolute value of the focal distance f2 of the second lens L2 satisfies |f2|=22.19, the absolute value of the focal distance f3 of the third lens L3 satisfies |f3|=7.68, and the Abbe number V2 of the second lens L2 and the Abbe number V3 of the third lens L3 are configured to satisfy |V3−V2|=36.6.

In addition, the absolute value of the ratio of the effective focal distance f123 of the first lens L1, the second lens L2, and the third lens L3 to the effective focal distance f4567 of the fourth lens L4, the fifth lens L5, the sixth lens L6, and the seventh lens L7 satisfies |f123/f4567|=0.36.

In addition, the distance To from the object-side surface of the first lens L1 to the object satisfies To=3600 mm, the distance T36 from the image-side surface of the third lens L3 to the object-side surface of the sixth lens L6 satisfies T36=2.73 mm, and the ratio of the field of view Fov of the small lens system to the effective focal distance f of the entire optical system satisfies Fov/f=15.86.

FIG. 3 is a view showing aberration according to a first embodiment of the present invention.

First data of FIG. 3 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the first embodiment of the present invention is 0.025 mm (focus) or less, which is determined to be good.

Second data of FIG. 3 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the first embodiment of the present invention is 0.025 mm (focus) or less, which is determined to be good.

Third data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good.

Optical distortion, as the distortion aberration according to the first embodiment of the present invention, is 2% or less, which is determined to be good.

Second Embodiment

FIG. 4 is a view showing a second embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 3 below shows numerical data of the lenses constituting the optical system according to the second embodiment of the present invention.

TABLE 3

| Surface (Surface number) | RDY (Radius of curvature) | THI (Thickness) | Nd (Refractive index) | Vd (Abbe number) |
|---|---|---|---|---|
| OBJECT | INFINITY | 3600 | | |
| 1 | 2.38 | 0.76 | 1.5441 | 56.0 |
| 2 | 7.13 | 0.18 | | |
| STO: | 3.07 | 0.23 | 1.67 | 19.4 |
| 4 | 2.40 | 0.44 | | |
| 5 | 26.29 | 0.73 | 1.5441 | 56.0 |
| 6 | −4.63 | 0.36 | | |
| 7 | −1.44 | 0.45 | 1.615 | 25.9 |
| 8 | −2.59 | 0.07 | | |
| 9 | 1.80 | 0.48 | 1.5441 | 56.0 |
| 10 | 3.44 | 0.79 | | |
| 11 | 2.17 | 0.43 | 1.5441 | 56.0 |
| 12 | 1.46 | 0.19 | | |
| 13 | INFINITY | 0.35 | 1.535 | 56.0 |
| 14 | INFINITY | 0.10 | | |
| 15 | INFINITY | 0.21 | | |
| 16 | INFINITY | 0.78 | | |
| IMG: | INFINITY | 0.01 | | |

As shown in FIG. 4, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, ..., and $A_{14}$ indicate aspherical coefficients.

The aspherical coefficients having data of the respective lenses obtained from Mathematical Expression 1 above are shown in Table 4 below.

TABLE 4

| | K | A3 | A4 | A5 | A6 | A7 |
|---|---|---|---|---|---|---|
| s1 | 0.01210 | −4.400000E−03 | 1.670000E−02 | −4.350000E−02 | 6.220000E−02 | −5.510000E−02 |
| s2 | −2.748000E+01 | −4.490000E−02 | 3.700000E−02 | −1.710000E−02 | −1.530000E−02 | 3.500000E−02 |
| s3 | −33.11280 | 7.400000E−03 | −1.211000E−01 | 2.483000E−01 | −2.746000E−01 | 1.900000E−01 |
| s4 | −22.78390 | 1.000000E−01 | −2.624000E−01 | 5.011000E−01 | −6.390000E−01 | 5.678000E−01 |
| s5 | −99.00000 | −3.280000E−02 | 3.700000E−02 | −1.548000E−01 | 3.160000E−01 | −4.157000E−01 |
| s6 | −21.69580 | −5.690000E−02 | 3.600000E−02 | −1.112000E−01 | 1.904000E−01 | −2.100000E−01 |
| s7 | −1.19600 | 1.018000E−01 | −1.810000E−01 | 2.218000E−01 | −1.919000E−01 | 1.163000E−01 |
| s8 | −2.94390 | −4.960000E−02 | −3.310000E−02 | 9.510000E−02 | −9.970000E−02 | 6.500000E−02 |
| s9 | −5.24970 | −5.000000E−03 | 1.110000E−02 | −2.080000E−02 | 1.380000E−02 | −5.700000E−03 |
| s10 | −27.63390 | 1.034000E−01 | −8.130000E−02 | 3.620000E−02 | −1.170000E−02 | 2.700000E−03 |
| s11 | −1.17290 | −2.616000E−01 | 1.325000E−01 | −5.750000E−02 | 1.890000E−02 | −4.100000E−03 |
| s12 | −3.73790 | −1.943000E−01 | 1.211000E−01 | −6.570000E−02 | 2.400000E−02 | −5.400000E−03 |
| s13 | 0.00000 | 3.670000E−02 | −2.120000E−02 | −3.200000E−03 | 4.200000E−03 | −1.200000E−03 |
| s14 | 0.00000 | 6.030000E−02 | −3.180000E−02 | 7.500000E−03 | −1.100000E−03 | 9.463000E−05 |
| s15 | | | INFINITY | | | |
| s16 | | | INFINITY | | | |

| | A8 | A9 | A10 | A11 |
|---|---|---|---|---|
| s1 | 3.010000E−02 | −1.010000E−02 | 1.900000E−03 | −2.000000E−04 |
| s2 | −3.130000E−02 | 1.490000E−02 | −3.700000E−03 | 4.000000E−04 |
| s3 | −8.010000E−02 | 1.740000E−02 | −7.000000E−04 | −3.000000E−04 |
| s4 | −3.424000E−01 | 1.319000E−01 | −2.880000E−02 | 2.700000E−03 |
| s5 | 3.466000E−01 | −1.784000E−01 | 5.150000E−02 | −6.300000E−03 |
| s6 | 1.462000E−01 | −6.150000E−02 | 1.420000E−02 | −1.400000E−03 |
| s7 | −4.270000E−02 | 8.100000E−03 | −5.000000E−04 | −3.507000E−05 |
| s8 | −2.640000E−02 | 6.500000E−03 | −9.000000E−04 | 5.013000E−05 |
| s9 | 1.500000E−03 | −3.000000E−04 | 2.581000E−05 | −1.032000E−06 |
| s10 | −4.000000E−04 | 3.933000E−05 | −2.058000E−06 | 4.513200E−08 |
| s11 | 6.000000E−04 | −4.517000E−05 | 2.049000E−06 | −3.963000E−08 |
| s12 | 7.000000E−04 | −6.169000E−05 | 2.815000E−06 | −5.441000E−08 |
| s13 | 2.000000E−04 | −1.569000E−05 | 7.072000E−07 | −1.328000E−08 |
| s14 | −4.902000E−06 | 1.692000E−07 | −5.833000E−09 | 1.457000E−10 |
| s15 | | INFINITY | | |
| s16 | | INFINITY | | |

The ratio TTL/f of the distance TTL between the object-side surface of the first lens L1 and an image surface to the effective focal distance f of the entire optical system satisfies TTL/f=1.28.

The ratio of the radius of curvature R21 of the object-side surface of the second lens L2 to the effective focal distance f of the entire optical system satisfies R21/f=0.60, and the radius of curvature R41 of the object-side surface of the fourth lens L4 and the radius of curvature R42 of the image-side surface of the fourth lens L4 are configured to satisfy (R41-R42)/(R41+R42)=0.29.

In addition, the absolute value of the ratio TTL/ImagH of the distance TTL between the object-side surface of the first lens L1 and the image surface to the image height ImagH of the small lens system according to the present invention satisfies |TTL/ImagH|=1.53.

In addition, the absolute value of the focal distance f2 of the second lens L2 satisfies |f2|=18.75, the absolute value of the focal distance f3 of the third lens L3 satisfies |f3|=7.27, and the Abbe number V2 of the second lens L2 and the Abbe number V3 of the third lens L3 are configured to satisfy |V3−V2|=36.6.

In addition, the absolute value of the ratio of the effective focal distance f123 of the first lens L1, the second lens L2, and the third lens L3 to the effective focal distance f4567 of the fourth lens L4, the fifth lens L5, the sixth lens L6, and the seventh lens L7 satisfies |f123/f4567|=0.41.

In addition, the distance To from the object-side surface of the first lens L1 to the object satisfies To=3600 mm, the distance T36 from the image-side surface of the third lens L3 to the object-side surface of the sixth lens L6 satisfies T36=2.88 mm, and the ratio of the field of view Fov of the small lens system to the effective focal distance f of the entire optical system satisfies Fov/f=15.46.

FIG. 5 is a view showing aberration according to a second embodiment of the present invention.

First data of FIG. 5 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the second embodiment of the present invention is 0.025 mm (focus) or less, which is determined to be good.

Second data of FIG. 5 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the second embodiment of the present invention is 0.025 mm (focus) or less, which is determined to be good.

Third data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 6 is a view showing a third embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 5 below shows numerical data of the lenses constituting the lens system according to the third embodiment of the present invention.

TABLE 5

| Surface (Surface number) | RDY (Radius of curvature) | THI (Thickness) | Nd (Refractive index) | Vd (Abbe number) |
|---|---|---|---|---|
| OBJECT | INFINITY | 3600 | | |
| 1 | 2.38 | 0.76 | 1.5441 | 56.0 |
| 2 | 6.95 | 0.18 | | |
| STO: | 3.06 | 0.23 | 1.67 | 19.4 |
| 4 | 2.40 | 0.44 | | |
| 5 | 23.22 | 0.75 | 1.5441 | 56.0 |
| 6 | −4.68 | 0.36 | | |
| 7 | −1.44 | 0.45 | 1.615 | 25.9 |
| 8 | −2.62 | 0.06 | | |
| 9 | 1.78 | 0.48 | 1.5441 | 56.0 |
| 10 | 3.38 | 0.78 | | |
| 11 | 2.07 | 0.43 | 1.5441 | 56.0 |
| 12 | 1.42 | 0.19 | | |
| 13 | INFINITY | 0.35 | 1.535 | 56.0 |
| 14 | INFINITY | 0.10 | | |
| 15 | INFINITY | 0.21 | | |
| 16 | INFINITY | 0.78 | | |
| IMG: | INFINITY | 0.01 | | |

As shown in FIG. 6, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 6 below.

TABLE 6

| | K | A3 | A4 | A5 | A6 | A7 |
|---|---|---|---|---|---|---|
| s1 | 0.01150 | −4.600000E−03 | 1.760000E−02 | −4.550000E−02 | 6.470000E−02 | −5.730000E−02 |
| s2 | −2.715210E+01 | −4.380000E−02 | 3.280000E−02 | −7.800000E−03 | −2.870000E−02 | 4.680000E−02 |
| s3 | −33.06510 | 9.500000E−03 | −1.308000E−01 | 2.683000E−01 | −2.989000E−01 | 2.090000E−01 |
| s4 | −23.10820 | 1.010000E−01 | −2.665000E−01 | 4.998000E−01 | −6.175000E−01 | 5.275000E−01 |
| s5 | −99.00000 | −3.300000E−02 | 3.720000E−02 | −1.548000E−01 | 3.160000E−01 | −4.157000E−01 |

TABLE 6-continued

|  |  |  |  |  |  |  |
|---|---|---|---|---|---|---|
| s6 | −21.25000 | −5.460000E−02 | 2.720000E−02 | −9.260000E−02 | 1.649000E−01 | −1.887000E−01 |
| s7 | −1.19540 | 1.110000E−01 | −2.111000E−01 | 2.789000E−01 | −2.616000E−01 | 1.707000E−01 |
| s8 | −2.87750 | −4.980000E−02 | −3.720000E−02 | 1.064000E−01 | −1.137000E−01 | 7.510000E−02 |
| s9 | −5.40650 | −6.600000E−03 | 1.570000E−02 | −2.590000E−02 | 1.680000E−02 | −6.800000E−03 |
| s10 | −27.63390 | 1.037000E−01 | −8.050000E−02 | 3.520000E−02 | −1.120000E−02 | 2.500000E−03 |
| s11 | −1.21070 | −2.729000E−01 | 1.412000E−01 | −6.270000E−02 | 2.100000E−02 | −4.600000E−03 |
| s12 | −3.80710 | −1.947000E−01 | 1.221000E−01 | −6.660000E−02 | 2.440000E−02 | −5.500000E−03 |
| s13 | 0.00000 | 3.960000E−02 | −2.260000E−02 | −2.400000E−03 | 3.900000E−03 | −1.100000E−03 |
| s14 | 0.00000 | 6.220000E−02 | −3.210000E−02 | 7.400000E−03 | −1.100000E−03 | 9.141000E−05 |
| s15 |  |  | INFINITY |  |  |  |
| s16 |  |  | INFINITY |  |  |  |

|  | A8 | A9 | A10 | A11 |
|---|---|---|---|---|
| s1 | 3.150000E−02 | −1.070000E−02 | 2.000000E−03 | −2.000000E−04 |
| s2 | −3.740000E−02 | 1.670000E−02 | −3.900000E−03 | 4.000000E−04 |
| s3 | −8.930000E−02 | 2.010000E−02 | −1.100000E−02 | −3.000000E−04 |
| s4 | −3.043000E−01 | 1.115000E−01 | −2.300000E−02 | 2.000000E−03 |
| s5 | 3.466000E−01 | −1.784000E−01 | 5.150000E−02 | −6.300000E−03 |
| s6 | 1.352000E−01 | −5.800000E−02 | 1.360000E−02 | −1.400000E−03 |
| s7 | −6.970000E−02 | 1.630000E−02 | −1.900000E−03 | 7.011000E−05 |
| s8 | −3.080000E−02 | 7.600000E−03 | −1.000000E−03 | 6.039000E−05 |
| s9 | 1.800000E−03 | −3.000000E−04 | 2.782000E−05 | −1.119000E−06 |
| s10 | −4.000000E−04 | 3.652000E−05 | −1.891000E−06 | 4.085000E−08 |
| s11 | 6.000000E−04 | −5.336000E−05 | 2.463000E−06 | −4.840000E−08 |
| s12 | 8.000000E−04 | −6.303000E−05 | 2.877000E−06 | −5.563000E−08 |
| s13 | 2.000000E−04 | −1.435000E−05 | 6.417000E−07 | −1.194000E−08 |
| s14 | −4.848600E−06 | 1.938000E−07 | −7.934000E−09 | 1.979000E−10 |
| s15 |  | INFINITY |  |  |
| s16 |  | INFINITY |  |  |

The ratio TTL/f of the distance TTL between the object-side surface of the first lens L1 and an image surface to the effective focal distance f of the entire optical system satisfies TTL/f=1.28.

The ratio of the radius of curvature R21 of the object-side surface of the second lens L2 to the effective focal distance f of the entire optical system satisfies R21/f=0.60, and the radius of curvature R41 of the object-side surface of the fourth lens L4 and the radius of curvature R42 of the image-side surface of the fourth lens L4 are configured to satisfy (R41−R42)/(R41+R42)=0.29.

In addition, the absolute value of the ratio TTL/ImagH of the distance TTL between the object-side surface of the first lens L1 and the image surface to the image height ImagH of the small lens system according to the present invention satisfies |TTL/ImagH|=1.53.

In addition, the absolute value of the focal distance f2 of the second lens L2 satisfies |f2|=19.15, the absolute value of the focal distance f3 of the third lens L3 satisfies |f3|=7.21, and the Abbe number V2 of the second lens L2 and the Abbe number V3 of the third lens L3 are configured to satisfy |V3−V2|=36.6.

In addition, the absolute value of the ratio of the effective focal distance f123 of the first lens L1, the second lens L2, and the third lens L3 to the effective focal distance f4567 of the fourth lens L4, the fifth lens L5, the sixth lens L6, and the seventh lens L7 satisfies |f123/f4567|=0.42.

In addition, the distance To from the object-side surface of the first lens L1 to the object satisfies To=3600 mm, the distance T36 from the image-side surface of the third lens L3 to the object-side surface of the sixth lens L6 satisfies T36=2.87 mm, and the ratio of the field of view Fov of the small lens system to the effective focal distance f of the entire optical system satisfies Fov/f=15.46.

FIG. 7 is a view showing aberration according to a third embodiment of the present invention.

First data of FIG. 7 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the third embodiment of the present invention is 0.025 mm (focus) or less, which is determined to be good.

Second data of FIG. 7 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the third embodiment of the present invention is 0.025 mm (focus) or less, which is determined to be good.

Third data of FIG. 7 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the third embodiment of the present invention, is 2% or less, which is determined to be good.

Fourth Embodiment

FIG. 8 is a view showing a fourth embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 7 below shows numerical data of the lenses constituting the lens system according to the fourth embodiment of the present invention.

TABLE 7

| Surface (Surface number) | RDY (Radius of curvature) | THI (Thickness) | Nd (Refractive index) | Vd (Abbe number) |
|---|---|---|---|---|
| OBJECT | INFINITY | 3600 | | |
| 1 | 2.36 | 7.90 | 1.5441 | 56.0 |
| 2 | 6.59 | 0.18 | | |
| STO: | 3.02 | 0.23 | 1.67 | 19.4 |
| 4 | 2.40 | 0.43 | | |
| 5 | 18.78 | 0.74 | 1.5441 | 56.0 |

TABLE 8

| | K | A3 | A4 | A5 | A6 | A7 |
|---|---|---|---|---|---|---|
| s1 | 0.01540 | −5.200000E−03 | 1.990000E−02 | −5.020000E−02 | 6.990000E−01 | −6.040000E−02 |
| s2 | −2.662610E+01 | −4.270000E−02 | 3.130000E−02 | −4.900000E−03 | −3.510000E−02 | 5.460000E−02 |
| s3 | −32.74750 | 1.310000E−02 | −1.508000E−01 | 3.253000E−01 | −4.043000E−01 | 3.368000E−01 |
| s4 | −23.70710 | 1.046000E−01 | −2.887000E−01 | 5.547000E−01 | −7.037000E−01 | 6.208000E−01 |
| s5 | −99.00000 | −3.350000E−02 | 3.750000E−02 | −1.546000E−01 | 3.161000E−01 | −4.157000E−01 |
| s6 | −22.98570 | −5.650000E−02 | 3.570000E−02 | −1.040000E−01 | 1.782000E−01 | −2.028000E−01 |
| s7 | −1.19670 | 1.038000E−01 | −1.884000E−01 | 2.496000E−01 | −2.263000E−01 | 1.320000E−01 |
| s8 | −2.72620 | −6.110000E−02 | −2.170000E−02 | 1.032000E−01 | −1.230000E−01 | 8.530000E−02 |
| s9 | −5.63080 | −8.500000E−03 | 1.810000E−02 | −2.800000E−02 | 1.800000E−02 | −7.200000E−03 |
| s10 | −27.63390 | 1.031000E−01 | −8.120000E−02 | 3.600000E−02 | −1.170000E−02 | 2.700000E−03 |
| s11 | −1.30450 | −2.728000E−02 | 1.412000E−01 | −6.270000E−02 | 2.100000E−02 | −4.600000E−03 |
| s12 | −3.72430 | −1.816000E−01 | 1.113000E−01 | −5.980000E−02 | 2.150000E−02 | −4.800000E−03 |
| s13 | 0.00000 | 4.130000E−02 | −2.180000E−02 | −1.400000E−03 | 2.900000E−04 | −8.000000E−04 |
| s14 | 0.00000 | 5.220000E−02 | −2.390000E−02 | 4.400000E−03 | −5.000000E−04 | 2.735000E−05 |
| s15 | | | INFINITY | | | |
| s16 | | | INFINITY | | | |

| | A8 | A9 | A10 | A11 |
|---|---|---|---|---|
| s1 | 3.250000E−02 | −1.080000E−02 | 2.000000E−03 | −2.000000E−04 |
| s2 | −4.250000E−02 | 1.840000E−02 | −4.200000E−03 | 4.000000E−04 |
| s3 | −1.883000E−01 | 6.690000E−02 | −1.340000E−02 | 1.100000E−03 |
| s4 | −3.714000E−01 | 1.420000E−01 | −3.090000E−02 | 2.900000E−03 |
| s5 | 3.466000E−01 | −1.784000E−01 | 5.150000E−02 | −6.300000E−03 |
| s6 | 1.444000E−01 | −6.140000E−02 | 1.430000E−02 | −1.400000E−03 |
| s7 | −4.300000E−02 | 6.000000E−03 | 2.000000E−04 | −1.000000E−04 |
| s8 | −3.600000E−02 | 9.100000E−03 | −1.300000E−03 | 7.467000E−05 |
| s9 | 1.900000E−03 | −3.000000E−04 | 2.887000E−05 | −1.140000E−06 |
| s10 | −4.000000E−04 | 3.745000E−05 | −1.894000E−06 | 3.966000E−08 |
| s11 | 6.000000E−04 | −5.342000E−05 | 2.465000E−06 | −4.845000E−08 |
| s12 | 7.000000E−04 | −5.369000E−05 | 2.441000E−06 | −4.715000E−08 |
| s13 | 1.000000E−04 | −9.925000E−06 | 4.257000E−07 | −7.600000E−09 |
| s14 | −2.151000E−06 | 3.084000E−07 | −2.336000E−08 | 6.178000E−10 |
| s15 | | INFINITY | | |
| s16 | | INFINITY | | |

TABLE 7-continued

| Surface (Surface number) | RDY (Radius of curvature) | THI (Thickness) | Nd (Refractive index) | Vd (Abbe number) |
|---|---|---|---|---|
| 6 | −4.97 | 0.35 | | |
| 7 | −1.38 | 0.44 | 1.615 | 25.9 |
| 8 | −2.49 | 0.04 | | |
| 9 | 1.85 | 0.47 | 1.5441 | 56.0 |
| 10 | 3.60 | 0.70 | | |
| 11 | 1.89 | 0.43 | 1.5441 | 56.0 |
| 12 | 1.37 | 0.20 | | |
| 13 | INFINITY | 0.35 | 1.535 | 56.0 |
| 14 | INFINITY | 0.10 | | |
| 15 | INFINITY | 0.21 | | |
| 16 | INFINITY | 0.88 | | |
| IMG: | INFINITY | 0.01 | | |

As shown in FIG. 8, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 8 below.

The ratio TTL/f of the distance TTL between the object-side surface of the first lens L1 and an image surface to the effective focal distance f of the entire optical system satisfies TTL/f=1.28.

The ratio of the radius of curvature R21 of the object-side surface of the second lens L2 to the effective focal distance f of the entire optical system satisfies R21/f=0.59, and the radius of curvature R41 of the object-side surface of the fourth lens L4 and the radius of curvature R42 of the image-side surface of the fourth lens L4 are configured to satisfy (R41-R42)/(R41+R42)=0.29.

In addition, the absolute value of the ratio TTL/ImagH of the distance TTL between the object-side surface of the first lens L1 and the image surface to the image height ImagH of the small lens system according to the present invention satisfies |TTL/ImagH|=1.53.

In addition, the absolute value of the focal distance f2 of the second lens L2 satisfies |f2|=20.14, the absolute value of the focal distance f3 of the third lens L3 satisfies |f3|=7.28, and the Abbe number V2 of the second lens L2 and the Abbe number V3 of the third lens L3 are configured to satisfy |V3−V2|=36.6.

In addition, the absolute value of the ratio of the effective focal distance f123 of the first lens L1, the second lens L2, and the third lens L3 to the effective focal distance f4567 of the fourth lens L4, the fifth lens L5, the sixth lens L6, and the seventh lens L7 satisfies |f123/f4567|=0.38.

In addition, the distance To from the object-side surface of the first lens L1 to the object satisfies To=3600 mm, the distance T36 from the image-side surface of the third lens L3 to the object-side surface of the sixth lens L6 satisfies T36=2.74 mm, and the ratio of the field of view Fov of the small lens system to the effective focal distance f of the entire optical system satisfies Fov/f=15.46.

FIG. 9 is a view showing aberration according to a fourth embodiment of the present invention.

First data of FIG. 9 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fourth embodiment of the present invention is 0.025 mm (focus) or less, which is determined to be good.

Second data of FIG. 9 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fourth embodiment of the present invention is 0.025 mm (focus) or less, which is determined to be good.

Third data of FIG. 9 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fourth embodiment of the present invention, is 2% or less, which is determined to be good.

Fifth Embodiment

FIG. 10 is a view showing a fifth embodiment of the high-resolution wide-angle lens system according to the present invention.

As shown, a first lens L1, a second lens L2, a third lens L3, a fourth lens L4, a fifth lens L5, a sixth lens L6, and a seventh lens L7 are sequentially arranged from an object on the optical axis.

Table 9 below shows numerical data of the lenses constituting the lens system according to the fifth embodiment of the present invention.

TABLE 9

| Surface (Surface number) | RDY (Radius of curvature) | THI (Thickness) | Nd (Refractive index) | Vd (Abbe number) |
|---|---|---|---|---|
| OBJECT | INFINITY | 3600 | | |
| 1 | 2.37 | 0.78 | 1.5441 | 56.0 |
| 2 | 6.81 | 0.18 | | |
| STO: | 3.07 | 0.23 | 1.67 | 19.4 |
| 4 | 2.43 | 0.45 | | |
| 5 | 20.07 | 0.74 | 1.5441 | 56.0 |
| 6 | −4.92 | 0.35 | | |
| 7 | −1.42 | 0.46 | 1.615 | 25.9 |
| 8 | −2.63 | 0.04 | | |
| 9 | 1.75 | 0.48 | 1.5441 | 56.0 |
| 10 | 3.31 | 0.78 | | |
| 11 | 2.02 | 0.43 | 1.5441 | 56.0 |
| 12 | 1.40 | 0.19 | | |
| 13 | INFINITY | 0.35 | 1.535 | 56.0 |
| 14 | INFINITY | 0.10 | | |
| 15 | INFINITY | 0.21 | | |
| 16 | INFINITY | 0.78 | | |
| IMG: | INFINITY | 0.01 | | |

As shown in FIG. 10, the first lens L1, the second lens L2, the third lens L3, the fourth lens L4, the fifth lens L5, the sixth lens L6, and the seventh lens L7 are sequentially arranged from the object. On the assumption that an optical-axis direction is X and a direction perpendicular to the optical axis is Y, an aspherical equation is defined by Mathematical Expression 1 above.

An aspherical surface is a curved surface obtained by rotating a curve obtained by the aspherical equation of Mathematical Expression 1 about the optical axis. R indicates the radius of curvature, K indicates a conic constant, and $A_3$, $A_4$, $A_5$, $A_6$, . . . , and $A_{14}$ indicate aspherical coefficients.

The aspherical coefficients having data of the respective lenses obtained from Mathematical Expression 1 above are shown in Table 10 below.

TABLE 10

| | K | A3 | A4 | A5 | A6 | A7 |
|---|---|---|---|---|---|---|
| s1 | 0.01630 | −4.800000E−03 | 1.650000E−02 | −3.960000E−02 | 5.130000E−02 | −4.060000E−02 |
| s2 | −2.716510E+01 | −4.310000E−02 | 3.210000E−02 | −1.040000E−02 | −2.090000E−02 | 3.600000E−02 |
| s3 | −33.00160 | 9.300000E−03 | −1.281000E−01 | 2.605000E−01 | −2.913000E−01 | 2.101000E−01 |
| s4 | −23.72510 | 1.002000E−01 | −2.633000E−01 | 4.884000E−01 | −5.944000E−01 | 4.991000E−01 |
| s5 | −90.27480 | −3.280000E−02 | 3.740000E−02 | −1.547000E−01 | 3.161000E−01 | −4.157000E−01 |
| s6 | −21.59290 | −5.220000E−02 | 2.350000E−02 | −9.370000E−02 | 1.745000E−01 | −2.010000E−01 |
| s7 | −1.19980 | 1.192000E−01 | −2.322000E−01 | 3.011000E−01 | −2.675000E−01 | 1.619000E−01 |
| s8 | −2.77700 | −5.030000E−02 | −3.990000E−02 | 1.115000E−01 | −1.163000E−01 | 7.520000E−02 |
| s9 | −5.49110 | −6.800000E−03 | 1.650000E−02 | −2.700000E−02 | 1.800000E−02 | −7.400000E−03 |
| s10 | −27.63390 | 1.082000E−01 | −8.730000E−02 | 4.020000E−02 | −1.320000E−02 | 3.000000E−03 |
| s11 | −1.22990 | −2.748000E−01 | 1.426000E−01 | −6.350000E−02 | 2.130000E−02 | −4.700000E−03 |
| s12 | −3.90590 | −1.883000E−01 | 1.168000E−01 | −6.300000E−02 | 2.280000E−01 | −5.100000E−03 |

TABLE 10-continued

| | | | | | |
|---|---|---|---|---|---|
| s13 | 0.00000 | 3.980000E−02 | −2.150000E−02 | −2.600000E−03 | 3.700000E−03 | −1.100000E−03 |
| s14 | 0.00000 | 6.020000E−02 | −3.000000E−02 | 6.500000E−03 | −8.000000E−04 | 4.740600E−05 |
| s15 | | | | INFINITY | | |
| s16 | | | | INFINITY | | |

| | A8 | A9 | A10 | A11 |
|---|---|---|---|---|
| s1 | 1.940000E−02 | −5.600000E−03 | 9.000000E−04 | −6.054500E−05 |
| s2 | −2.880000E−02 | 1.260000E−02 | −2.900000E−03 | 3.000000E−04 |
| s3 | −9.780000E−02 | 2.750000E−02 | −3.900000E−03 | 2.000000E−04 |
| s4 | −2.820000E−01 | 1.009000E−01 | −2.020000E−02 | 1.700000E−03 |
| s5 | 3.466000E−01 | −1.784000E−01 | 5.150000E−02 | −6.300000E−03 |
| s6 | 1.426000E−01 | −6.020000E−02 | 1.390000E−02 | −1.400000E−03 |
| s7 | −6.060000E−02 | 1.270000E−02 | −1.200000E−03 | 1.785200E−05 |
| s8 | −3.050000E−02 | 7.500000E−03 | −1.000000E−03 | 5.897300E−05 |
| s9 | 2.000000E−03 | −3.000000E−04 | 2.930500E−05 | −1.140100E−06 |
| s10 | −5.000000E−04 | 4.186700E−05 | −2.118900E−06 | 4.471100E−08 |
| s11 | 7.000000E−04 | −5.450500E−05 | 2.515000E−06 | −4.932300E−08 |
| s12 | 7.000000E−04 | −5.679300E−05 | 2.565100E−06 | −4.910600E−08 |
| s13 | 2.000000E−04 | −1.266200E−05 | 5.530100E−07 | −1.007000E−08 |
| s14 | −4.275300E−07 | −6.913600E−08 | 4.927400E−10 | 8.636900E−11 |
| s15 | | INFINITY | | |
| s16 | | INFINITY | | |

The ratio TTL/f of the distance TTL between the object-side surface of the first lens L1 and an image surface to the effective focal distance f of the entire optical system satisfies TTL/f=1.28.

The ratio of the radius of curvature R21 of the object-side surface of the second lens L2 to the effective focal distance f of the entire optical system satisfies R21/f=0.60, and the radius of curvature R41 of the object-side surface of the fourth lens L4 and the radius of curvature R42 of the image-side surface of the fourth lens L4 are configured to satisfy (R41−R42)/(R41+R42)=0.30.

In addition, the absolute value of the ratio TTL/ImagH of the distance TTL between the object-side surface of the first lens L1 and the image surface to the image height ImagH of the small lens system according to the present invention satisfies |TTL/ImagH|=1.53.

In addition, the absolute value of the focal distance f2 of the second lens L2 satisfies |f2|=20.14, the absolute value of the focal distance f3 of the third lens L3 satisfies |f3|=7.32, and the Abbe number V2 of the second lens L2 and the Abbe number V3 of the third lens L3 are configured to satisfy |V3−V2|=36.6.

In addition, the absolute value of the ratio of the effective focal distance f123 of the first lens L1, the second lens L2, and the third lens L3 to the effective focal distance f4567 of the fourth lens L4, the fifth lens L5, the sixth lens L6, and the seventh lens L7 satisfies |f123/f4567|=0.41.

In addition, the distance To from the object-side surface of the first lens L1 to the object satisfies To=3600 mm, the distance T36 from the image-side surface of the third lens L3 to the object-side surface of the sixth lens L6 satisfies T36=2.84 mm, and the ratio of the field of view Fov of the small lens system to the effective focal distance f of the entire optical system satisfies Fov/f=15.48.

FIG. 10 is a view showing aberration according to a fifth embodiment of the present invention.

First data of FIG. 10 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the fifth embodiment of the present invention is 0.025 mm (focus) or less, which is determined to be good.

Second data of FIG. 10 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the fifth embodiment of the present invention is 0.025 mm (focus) or less, which is determined to be good.

Third data of FIG. 10 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the fifth embodiment of the present invention, is 2% or less, which is determined to be good.

As is apparent from the above description, the present invention relates to a lens system including a first lens, a second lens, a third lens, a fourth lens, a fifth lens, a sixth lens, and a seventh lens arranged from an object along an optical axis, particularly to a small wide-angle lens system configured such that the lens system is small and lightweight by appropriately designing the refractive powers, shapes, etc. of the lenses and such that the lens system has a horizontal field of view greater than 80 degrees by correcting distortion.

In particular, the present invention provides a small wide-angle lens system configured such that the curvature of the lens system is increased in order to reduce power, whereby the tolerance of the lens system is alleviated even though TTL is short.

In particular, the ratio of the distance between the object-side surface of the first lens and an image surface to the height of the image surface is less than 1.5, whereby it is possible to provide a lens system having a short length, which is easily applicable to a thin or small camera module, particularly a smartphone.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system comprising a first lens, a second lens, a third lens, a fourth lens, a fifth lens, a sixth lens, and a seventh lens sequentially arranged from an object, wherein the first lens has a positive refractive power, the second lens has a negative refractive power, the third lens has a positive refractive power, the fourth lens has a negative refractive power, the fifth lens is convex toward the object, is concave toward an image, and has a positive refractive power, the sixth lens has a positive or negative refractive power and is provided on at least one of an object-side surface and an image-side surface thereof with a single inflection point or a plurality of inflection points, and the seventh lens has a positive or negative refractive power and is configured such that a radius of curvature (R71) of an object-side surface of the seventh lens and a radius of curvature (R72) of an image-side surface of the seventh lens satisfy R71=∞ and R72=∞, respectively, and a ratio (TTL/f) of a distance (TTL) between an object-side surface of the first lens and an image surface to an effective focal distance (f) of an entire optical system satisfies TTL/f<1.3.

2. The small lens system according to claim 1, wherein an absolute value of a ratio of the distance (TTL) between the object-side surface of the first lens and the image surface to an image height (ImagH) of the small lens system satisfies 1.4<|TTL/ImagH|<1.6.

3. The small lens system according to claim 1, wherein each of the first to seventh lenses is made of a plastic material, and all surfaces of the lenses are formed as aspherical surfaces.

4. The small lens system according to claim 1, wherein the small lens system has a field of view greater than 80 degrees.

5. The small lens system according to claim 1, wherein an Abbe number (V2) of the second lens and an Abbe number (V3) of the third lens are configured to satisfy |V3−V2|<45.

6. The small lens system according to claim 1, wherein a distance (To) from the object-side surface of the first lens to the object satisfies 3500 mm<To<3700 mm.

7. The small lens system according to claim 1, wherein a distance (T36) from an image-side surface of the third lens to an object-side surface of the sixth lens satisfies T36<2.9 mm.

8. The small lens system according to claim 1, wherein an absolute value of a ratio of an effective focal distance (f123) of the first lens, the second lens, and the third lens to an effective focal distance (f4567) of the fourth lens, the fifth lens, the sixth lens, and the seventh lens satisfies 0.3<|f123/f4567|<0.8.

9. The small lens system according to claim 1, wherein a ratio of a radius of curvature (R21) of an object-side surface of the second lens to an effective focal distance (f) of an entire optical system satisfies 0.5<R21/f.

10. The small lens system according to claim 1, wherein a radius of curvature (R41) of an object-side surface of the fourth lens and a radius of curvature (R42) of an image-side surface of the fourth lens are configured to satisfy −0.5<(R41−R42)/(R41+R42)<0.5.

11. The small lens system according to claim 1, wherein a focal distance (f2) of the second lens and a focal distance (f3) of the third lens are configured to satisfy |f3|<|f2|.

12. The small lens system according to claim 1, wherein a ratio of a field of view (Fov) of the small lens system to an effective focal distance (f) of an entire optical system satisfies 7<Fov/f.

13. The small lens system according to claim 1, wherein an Abbe number (V1) of the first lens, an Abbe number (V2) of the second lens, an Abbe number (V3) of the third lens, an Abbe number (V4) of the fourth lens, an Abbe number (V5) of the fifth lens, an Abbe number (V6) of the sixth lens, and an Abbe number (V7) of the seventh lens satisfy 50<V1<60, 15<V2<30, 50<V3<60, 15<V4<30, 50<V5<60, 50<V6<60, and 50<V7<60, respectively.

14. The small lens system according to claim 1, wherein the small lens system is mounted in a camera module of a mobile device.

* * * * *